(12) United States Patent
Kumari Adari

(10) Patent No.: US 11,989,056 B2
(45) Date of Patent: May 21, 2024

(54) SMART CONTACT LENS FOR PERFORMING WIRELESS OPERATIONS AND A METHOD OF PRODUCING THE SAME

(71) Applicant: Apparao Boddeda, Visakhapatnam (IN)

(72) Inventor: Swarna Kumari Adari, Visakhapatnam (IN)

(*) Notice: Subject to any disclaimer, the term of this patent is extended or adjusted under 35 U.S.C. 154(b) by 585 days.

(21) Appl. No.: 17/250,126

(22) PCT Filed: Jun. 1, 2019

(86) PCT No.: PCT/IB2019/054561
§ 371 (c)(1),
(2) Date: Dec. 3, 2020

(87) PCT Pub. No.: WO2019/229725
PCT Pub. Date: Dec. 5, 2019

(65) Prior Publication Data
US 2021/0232177 A1 Jul. 29, 2021

(30) Foreign Application Priority Data
Jun. 2, 2018 (IN) .............................. 201841020740

(51) Int. Cl.
G06Q 20/00 (2012.01)
G02C 7/04 (2006.01)
G06F 1/16 (2006.01)
G06Q 20/32 (2012.01)

(52) U.S. Cl.
CPC ............... G06F 1/163 (2013.01); G02C 7/04 (2013.01); G06Q 20/321 (2020.05)

(58) Field of Classification Search
CPC .................................................... G96Q 20/321
See application file for complete search history.

(56) References Cited

U.S. PATENT DOCUMENTS

| 11,157,906 B1 * | 10/2021 | Smith ................. G06Q 20/405 |
| 11,241,166 B1 * | 2/2022 | Lee ........................ A61B 5/073 |
| 2006/0288267 A1 * | 12/2006 | DeSpain ................ G06F 40/18 715/212 |

(Continued)

OTHER PUBLICATIONS

A wearable and ubiquitous NFC wallet IEEE (Year: 2015).*

(Continued)

*Primary Examiner* — Bruce I Ebersman

(57) ABSTRACT

The present invention relates generally to the field of wearable devices and transaction banking and more particularly to a smart wearable contact lens (4) based wireless (3) transaction system and method thereof which has capability to works at both point of sale (PoS) system (2) and/or at automated teller machine (ATM) (1) centers for our purchases as well as for ATM transactions. Accordingly, an aspect of the present invention is to a smart wearable contact lens having encapsulated circuitry (304) for wireless communication like NFC, WiFi (Wireless Fidelity), Bluetooth, RFID and other short-range wireless communication technologies, VLSI chip, sensors like iris scanner and transceiver which is embedded in the smart wearable contact lens to initiate/perform at least one transaction.

5 Claims, 5 Drawing Sheets

(56) References Cited

U.S. PATENT DOCUMENTS

| | | | | |
|---|---|---|---|---|
| 2013/0194540 A1* | 8/2013 | Pugh | ................ | B29D 11/00817 |
| | | | | 623/6.11 |
| 2014/0088881 A1* | 3/2014 | Saeedi | ................ | A61B 5/14532 |
| | | | | 702/19 |
| 2014/0214547 A1* | 7/2014 | Signorelli | .......... | G06Q 30/0267 |
| | | | | 705/14.64 |
| 2015/0261294 A1* | 9/2015 | Urbach | ................. | G02C 7/101 |
| | | | | 351/158 |
| 2015/0281411 A1* | 10/2015 | Markus | ................ | A45C 11/005 |
| | | | | 455/556.1 |
| 2015/0317569 A1* | 11/2015 | Renaudie | ............ | G06V 30/414 |
| | | | | 705/5 |
| 2015/0348162 A1* | 12/2015 | Morris | ................ | G06Q 30/0631 |
| | | | | 705/26.7 |
| 2016/0276678 A1* | 9/2016 | Jorgensen | ............ | G02C 7/083 |
| 2017/0116657 A1* | 4/2017 | Oh | ...................... | G06Q 20/387 |
| 2017/0371184 A1* | 12/2017 | Shtukater | ................ | G02C 7/04 |
| 2019/0004325 A1* | 1/2019 | Connor | ............. | G02B 27/0172 |
| 2019/0132732 A1* | 5/2019 | Bharti | ...................... | G02C 7/04 |
| 2020/0152312 A1* | 5/2020 | Connor | .................. | G06V 20/20 |
| 2021/0097520 A1* | 4/2021 | Adari | .................. | G06F 21/6209 |
| 2021/0232177 A1* | 7/2021 | Adari | .................. | G06Q 20/321 |
| 2022/0057655 A1* | 2/2022 | Chiu | ........................ | G02C 7/04 |
| 2023/0025694 A1* | 1/2023 | Lakowicz | ............. | C09K 11/06 |
| 2024/0004202 A1* | 1/2024 | Kim | .................. | G02B 27/0172 |
| 2024/0004544 A1* | 1/2024 | Kang | ...................... | G06F 21/82 |
| 2024/0019719 A1* | 1/2024 | Yokoyama | .............. | G02C 1/10 |
| 2024/0027797 A1* | 1/2024 | Song | ...................... | G03B 11/04 |
| 2024/0036354 A1* | 2/2024 | Si | .......................... | G02B 1/043 |

OTHER PUBLICATIONS

A wearable and ubiquitous NFC wallet IEEE (Year: 2014).*
Futuristic Banking: Streamlining ATM Transactions with Fingerprint and Contactless Authentication IEEE (Year: 2023).*
Security of NFC Banking Transactions: Overview on Attacks and Solutions IEEE (Year: 2022).*

* cited by examiner

SMART CONTACT LENS FOR PERFORMING WIRELESS OPERATIONS AND A METHOD OF PRODUCING THE SAME

TECHNICAL FIELD

The present invention relates generally to the field of wearable devices, specifically a contact lens, and more particularly to a smart contact lens for performing wireless operations and a method of producing the same.

BACKGROUND

Historically, consumer purchases were actually trades, an exchange of an item of value for a different item of similar value. The invention of currency thousands of years ago provided the ability to carry something of general value that could be exchanged for virtually any useful item, thus lightening a consumer's load considerably. The much more recent invention of credit cards has allowed the consumer to carry an item representing value that was not itself intrinsically valuable, reducing the consumer's load and value as a theft target but still allowing him or her to carry considerable purchasing power.

The still more recent invention of debit cards has enabled consumers to wield the purchasing power accorded to credit cards without meeting the credit worthiness requirements of credit accounts and without incurring the associated debt. Debit cards draw from a positive account balance maintained by the user and require verification of identification, usually a personal identification number (PIN) to complete a purchase.

"Smart Cards" are another recent transaction device that also requires a personal identification number to complete a transaction. Smart Cards, like debit cards, execute purchases from a positive account balance but the balance is maintained in the card itself. Additions to the card balance must be properly purchased and, typically, Smart Cards have safeguards against an illicit account increase.

Credit-card and debit-card purchases require the use of a physical card or at least its entry into a purchasing system by number. In point-of-purchase transactions, the buyer must either hand the card to a salesperson or physically "swipe" the card through a card reader slot. A salesperson merely does the swiping for the buyer or enters the card number by keypad or by phone. Food purchases by use of a debit card are very common at present day supermarkets. However, virtually all consumers have horror stories of waiting in the checkout line while a customer ahead in the line fumbles ineptly through the card purchase process, unable to master the intricacies of the card reader.

Users of Smart Cards are not immune to the disadvantages above. A buyer of goods from an automatic Smart Card-reading vending machine is required to swipe the card through a slot. The buyer is then required to enter a PIN to verify his or her identity and authorization for a purchase. Systems have begun to emerge that allow the non-contact use of Smart Cards through RF or infrared technology. However, a PIN must still be entered at some point in the transaction. If a Smart Card is stolen and the thief is able to acquire the rightful user's PIN, then there is no safeguard remaining to prevent the thief's access to the Smart Card's entire balance.

A reliable means of determining the identity of a potential user of a Smart Card, and thus whether that person is an authorized user, is by the use of biometric data identification. Biometric data is data taken from the measurement of some characteristic peculiar to an individual. A digitized thumbprint is an example of biometric data. Iris scans, speech pattern scans or various body temperature or electrical characteristics are also biometric data.

Also, in all above solutions, the user needs to carry either the cards or the NFC devices along for the transactions on ATM or to any PoS. However there is need for a system which is embedded to user's organ or body part. So, there is no need to carry anything additionally.

A need exists, therefore, for a means of enabling efficient and user-friendly operations (for example, financial transactions) that do not require a physical contact. A further need exists for such a means to employ biometric data reading in its operation and to fit in an easy to use and carry form factor. Another need exists for a user to be able to enable and authorize a transaction using without the physical exposure of a Smart Card.

Recent developments in the field of smart wearable contact lens create the possibility to use of smart wearable contact lens in the field of financial transactions. Google is working in-collaboration with other organizations to develop Smart wearable contact Lens under smart wearable contact lens project. The project aims to assist people with diabetes by constantly measuring the glucose levels in their tears.

SUMMARY

The problem underlying the present invention is that of providing a contact lens structurally and functionally designed to remedy the limits described above with reference to the prior art cited, and a method for producing same.

This problem is solved by the present invention by means of a smart contact lens, a method for producing same, provided in accordance with the following claims.

The present invention relates generally to the field of wearable devices and transaction banking, and more particularly to a smart wearable contact lens based wireless transaction system and method thereof which has capability to works at both point of sale (PoS) system and/or at automated teller machine (ATM) centers for our purchases as well as for ATM transactions.

The primary object of the present invention is to implement new enhanced secure smart wearable contact lens which can works at both POS and at ATM centers for regular purchases as well as for all our regular ATM transactions.

Accordingly, an aspect of the present invention is to a smart wearable contact lens having encapsulated circuitry for wireless communication like NFC, WiFi (Wireless Fidelity), Bluetooth, RFID and other short-range wireless communication technologies, VLSI chip, sensors like iris scanner and transceiver.

In an aspect, the smart wearable contact lens is a layered structure, where top and bottom layer of the contact lens having VLSI chip containing wireless communication circuitry along with embedded sensors.

In an aspect, the smart wearable contact lens also having energy storage module to store the energy to provide power to the chip. There may be solar cell module or any other power collection cell module.

In an aspect, a wearable authentication device can also include a data exchange system, such as for near-field communication (NFC) with an NFC chip or with Bluetooth™ low energy (BLTE), to communicate a fingerprint image, an image of a finger, a unique identifier of the wearable authentication device, and/or presence data to the associated device for authentication and to maintain operability of the associated device.

In an aspect, the smart wearable contact lens directly connects with the bank server. So, there is no need to load money every time. Every time the user transacts using smart wearable contact lens, the amount will be directly deducted from the user respective bank account. The authentication for the transaction using such smart wearable contact lens every time the user transact can be done with the bank server and bio-metric iris scan method.

In implementations, the device that is associated with the wearable smart wearable contact lens is a mobile phone that can be utilized for in-store purchase transactions, and the wearable authentication device validates the user authentication and continued presence to the mobile phone for authorization of an in-store purchase transaction. Alternatively or in addition, the associated device is an in-store transaction device of a merchant system that is implemented for electronic purchase transactions. A user can conduct an electronic purchase transaction with the wearable smart wearable contact lens that communicates purchase validation data to the in-store transaction device. The merchant system can then authenticate the user based on the purchase validation data to authorize the electronic purchase transaction.

An aspect of the present disclosure relates to a smart contact lens for performing the one or more operations. The smart contact lens includes a solid component capable of imparting shape and structure to said lens and a liquid component distributed substantially uniformly in said solid component, capable of favoring the compatibility between said lens and the eye of a wearer of said lens, wherein said solid component having one or more electronic components to perform the one or more operations.

In an aspect, the one or more operations are associated with financial transactions.

In an aspect, the one or more electronic components comprise one or more sensors. In another aspect, the one or more sensors are configured to authenticate a wearer and thereby perform the one or more operations.

In an aspect, the one or more electronic components comprise a chip that enables wireless communication.

In an aspect, the the one or more electronic components comprise a light-emitting diode (LED).

In an aspect, the one or more electronic components comprise a battery, and the battery is charged by blinking of an eye of a wearer or the battery charged by moving/rotating an eye ball of a wearer.

In an aspect, the one or more electronic components comprise an embedded micro switches to enable and/or disable the features of the smart lens.

In an aspect, the embedded micro switches may be pair or connected with an external device such as mobile devices and/or other computing devices to turn on and off.

In an aspect, the bank information consisting may be paired with using mobile device and/or other computing devices utilizing small range wireless techniques.

In an aspect, the authentication may be performed by capturing iris scan of both eyes independently and sending to the authentication server accordingly.

In an aspect, the the one or more electronic components comprise a processor and a memory configured to store data in encrypted form or binary format. In an aspect, the the data comprises a wearers identification to perform the one or more operations. In an aspect, the data comprises a list of financial institutions to perform the one or more operations.

In an aspect, the list of financial institutions is arranged in sequential pattern based on priority to perform the one or more operations.

An aspect of the present disclosure relates to a method for constructing a smart contact lens with embedded electronic circuitry. The method can include the steps of: obtaining a dry semi-manufactured product of said smart contact lens, made of polymeric material, constituting a solid component of said smart contact lens; installing one or more electronic components in said dry semi-manufactured product; and hydrating said dry semi-manufactured product in an aqueous solution to impart a liquid component distributed substantially uniformly in said solid component and thus obtain said smart contact lens.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION

Figure 1:
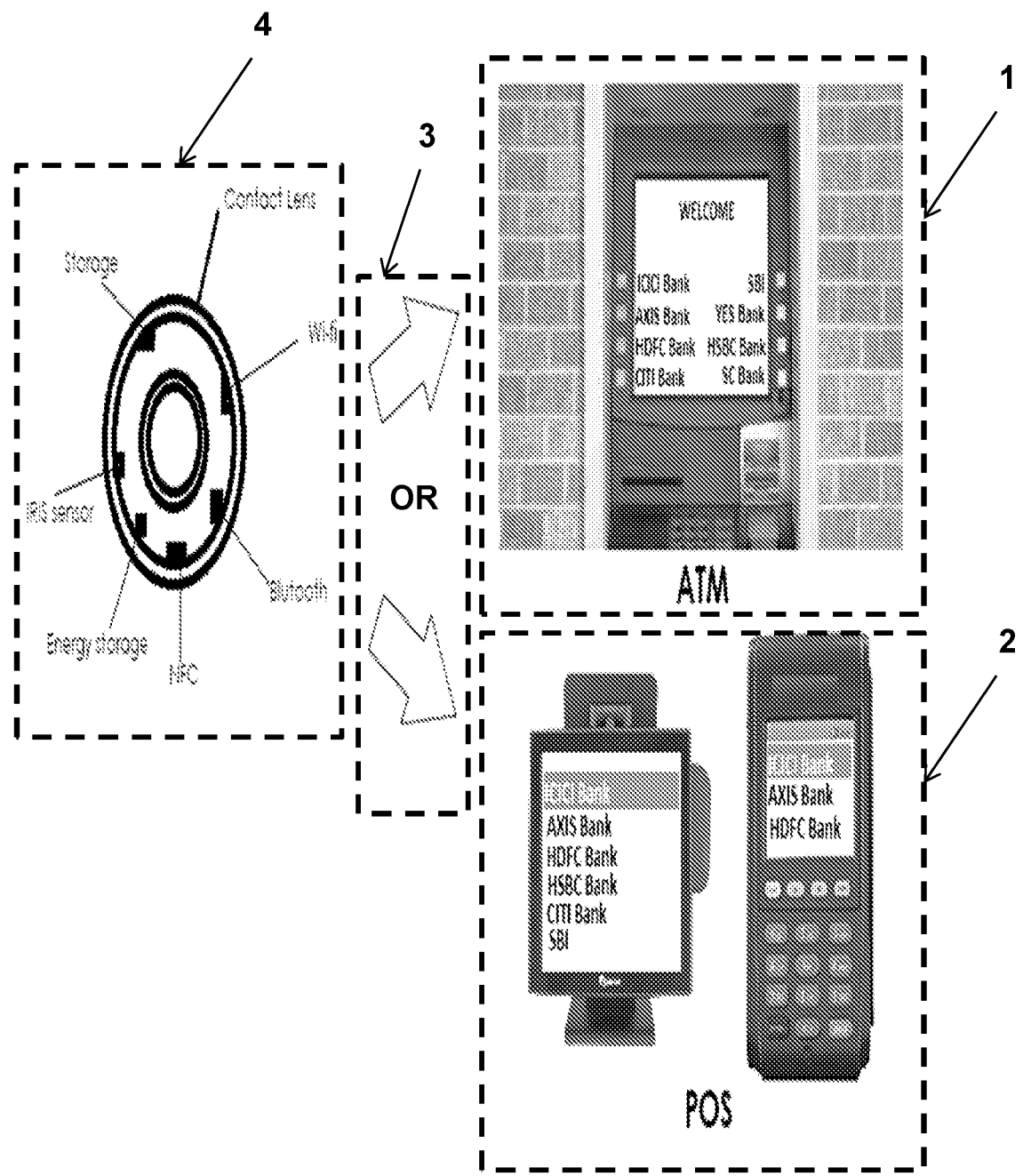
FIG. 1 illustrates an exemplary network implementation of the proposed system to elaborate its working, in accordance with an exemplary embodiment of the present disclosure.

The following is a detailed description of embodiments of the disclosure depicted in the accompanying drawings. The embodiments are in such detail as to clearly communicate the disclosure.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

It is known that contact lenses, whether they are cosmetic or corrective, are widely used among the population. Among these, particular importance is given to contact lenses of the soft type, which, compared with the other types of lenses (rigid or semi-rigid) provide greater comfort in use. The manufacturing process for contact lenses depends on whether the lenses are soft contacts, rigid gas permeable contacts or hybrid lenses. Soft contacts are made of hydrophilic ("water-loving") plastic polymers called hydrogels.

These materials can absorb water and become soft and pliable without losing their optical qualities.

This advantageous characteristic is provided by the high hydrophilic capacity of the lens which, containing a substantial percentage of water, permits greater compatibility between the lens and the eye, in addition to a greater deformability of the lens which allows it to adapt better to the surface of the eye.

Soft contact lenses are conventionally produced by means of a method which provides for a first step of obtaining a dry semi-manufactured product of lenticular shape and made of polymeric material, which may in turn be obtained by the polymerization of a monomer directly in a die (moulding technique), or by turning a disc of already polymerized material (turning technique).

Independently of the technique used for its preparation, the dry semi-manufactured product is then hydrated by immersion in a saline solution (known as a physiological solution) composed of around 1% by weight of sodium chloride in water. The polymeric material used is typically endowed with optimum hydrophilic properties, and is normally a polymeric mixture based on HEMA, so that a substantial amount of saline solution, between 25% and 75%, is absorbed in the dry semi-manufactured product.

The absorption of the liquid component, besides imparting to the lens the above-mentioned characteristics of compatibility and softness, also includes physical expansion of the dry semi-manufactured product, both radial and linear, thus determining both the final dimensions of the contact lens, and its optical properties.

The contact lens thus obtained thus comprises a solid component, defining the structural portion of the lens and composed of the polymeric material, and also a liquid component, composed of the saline solution, distributed almost uniformly in the solid component.

The present invention relates generally to the field of wearable devices, specifically contact lens, and more particularly to a smart wearable contact lens based wireless transaction system and method thereof which has capability to works at both point of sale (PoS) system and/or at automated teller machine (ATM) centers for our purchases as well as for ATM transactions.

The primary object of the present invention is to implement new enhanced secure smart wearable contact lens which can works at both POS and at ATM centers for regular purchases as well as for all our regular ATM transactions.

In an exemplary embodiment, the bank or credit information can be loaded on the smart wearable contact lens by placing the device near NFC module. The NFC module can be used to read the information from the user's debit card or credit card. By swiping/inserting/wireless connecting to the NFC module, the information can be loaded to smart wearable contact lens using display based interface device, if required. The user can also load information in the smart wearable contact lens using ATM having NFC/wireless communication interface.

In an exemplary embodiment, the information stored on the smart wearable contact lens is always in the encrypted form. The key to this encryption is only available with the bank. The information can be decrypted or modified using the NFC module using private key along with other security details to enhance the security of the information stored in the smart wearable contact lens.

FIG. 1 illustrates an exemplary network implementation of the proposed system to elaborate its working, in accordance with an exemplary embodiment of the present disclosure. As shown in FIG. 1, the smart contact lens (4) can wirelessly (3) communicate with the ATM (1) or a POS (2). The lens (4) may communicate with ATM or POS wirelessly through one or more communication mechanisms such as but not limited to Bluetooth, NFC, etc.

In an exemplary embodiment, while transacting at ATM (1), the ATM machine will pick up all the stored bank and card information in the smart wearable contact lens (4). All the bank and credit card can be displayed on the display of the ATM (1) or the POS (2) device as shown in FIG. 1.

By selecting the card, the user decided to go forward with the transaction. Based on the type of authentication selected by the user, the transaction will complete if the balance funds is available and authentication method is approved by the bank server.

In an exemplary embodiment, Bank DC—Where DC represents Debit Card and Bank CC—Where CC represents Credit Card as illustrated in FIG. 1.

The ATM will display all the configured bank and credit card account on the display of the ATM, once the user completes its first transaction. The user can repeat the steps and do another successful transaction from the same card or from different card. Once the user completes the transaction (s), the user can exit the ATM and the ATM will close the session.

While transacting with POS and/or merchant device, similar implementation like ATM can be possible. The POS device/reader will read the stored bank cards on the smart wearable contact lens and display the cards on the display of the POS and/or merchant device. According user or operator can choose with which card transaction can be made.

While features and concepts of a smart wearable contact lens can be implemented in any number of different devices, systems, and/or configurations, embodiments of a wearable authentication device are described in the context of the following example devices, systems, and methods.

FIG. 1 illustrates an exemplary overall architecture of the proposed system to elaborate its working, in accordance with an exemplary embodiment of the present disclosure. As shown in FIG. 1, the smart wearable contact lens having encapsulated circuitry for wireless communication like NFC, WiFi (Wireless Fidelity), Bluetooth, RFID and other short—range wireless communication technologies, VLSI chip, sensors like iris scanner and transceiver which is embedded in the smart wearable contact lens to initiate/perform at least one transaction.

The sensor like iris sensor embedded in the smart wearable contact lens is used for authentication of the user and the transactions performed using such smart wearable contact lens.

In an exemplary embodiment, the user can either enable the chip inside the smart wearable contact lens by using our mobile device such as enable or disable the chip.

In an exemplary embodiment, making transactions at POS and ATM are completely different and tricky. FIG. 1 illustrates the proposed smart wearable contact lens to do the transactions at POS as well as at ATM.

In an exemplary embodiment, the proposed smart wearable contact lens can be configured with the plurality of bank accounts so ATM can detect all the configured banks from the smart wearable contact lens and display all the bank names on the screen.

In an exemplary embodiment, the user can select the bank for transaction from the plurality of bank accounts displayed on the screen of ATM and enter the appropriate/associated bank ATM PIN and/or use fingerprint AND/OR inbuilt iris scan technology (as second level authentication).

In an exemplary embodiment, once the system authenticates the user then it displays the other options on the ATM screen to continue further the transaction. Once the transaction is completed the system can retain to the main screen which contains all the user specific bank names.

In an exemplary embodiment, once the user exits from the ATM center the system will automatically close the session and display the default ATM screen. All the information inside the smart wearable contact lens is completely encrypted so only bank server can decrypt and understand the information. If third person try to steal the information from the smart wearable contact lens they can get only encrypted data and or in binary format. The same smart wearable contact lens can be used for multiple bank transaction at POS as well as at ATM's Electronics that permits contactless transactions is also added to the Smart wearable contact lens. The electronics may be an integrated circuit chip that includes an electromagnetic transmitter and/or receiver for wirelessly sending and/or receiving transaction information.

Figure 2:
FIG. 2 illustrates an exemplary a diagrammatic perspective view of a smart contact lens produced, in accordance with an exemplary embodiment of the present disclosure.

FIG. 2 illustrates an exemplary a diagrammatic perspective view of a smart contact lens produced, in accordance with an exemplary embodiment of the present disclosure.

In an exemplary embodiment, the contact lens (4) is a lens of the soft type and may be of any known type, for cosmetic or corrective use, colored or transparent, without thereby influencing to any significant extent the innovative aspects of the present invention. The lens (4) is produced according to the following method.

In a first step, according to techniques that are quite conventional per se (by moulding or turning), a dry semi-manufactured product of polymeric material is produced, capable of imparting to the lens the structure and final configuration. The dry semi-manufactured product may be obtained from a polymeric mixture based on HEMA or from any other polymer or copolymer suitable for this purpose and normally used in the field.

In a subsequent preparation step, the dry semi-manufactured product is then hydrated by immersion in an aqueous solution, suitably agitated, so that into the solid component a liquid component is substantially uniformly absorbed, which favors comfortable use of the lens and therefore its compatibility with the eye of a user in which it is intended to be worn.

At the end of the hydration step, the lens 4 is then ready to be packaged and afterwards sterilized by means of treatment in an autoclave at around 120° C. for a period of around 20 minutes.

EXAMPLE 1: A Soft Contact Lens was Produced from a Dry Semi-manufactured product obtained by moulding from a polymeric mixture based on HEMA, and which was then hydrated in an aqueous solution comprising 0.2% of TSP, around 2% of mannitol and around 2% of monobasic and dibasic sodium phosphate.

EXAMPLE 2: A soft contact lens was produced by hydrating a dry semi-manufactured product, obtained in an analogous manner to that of example 1, in an aqueous solution comprising 0.2% of sodium hyaluronate, around 0.0015% of a surfactant, 0.1% of disodium EDTA as disinfecting agent, and a buffering agent based on sodium phosphate.

Figure 3:
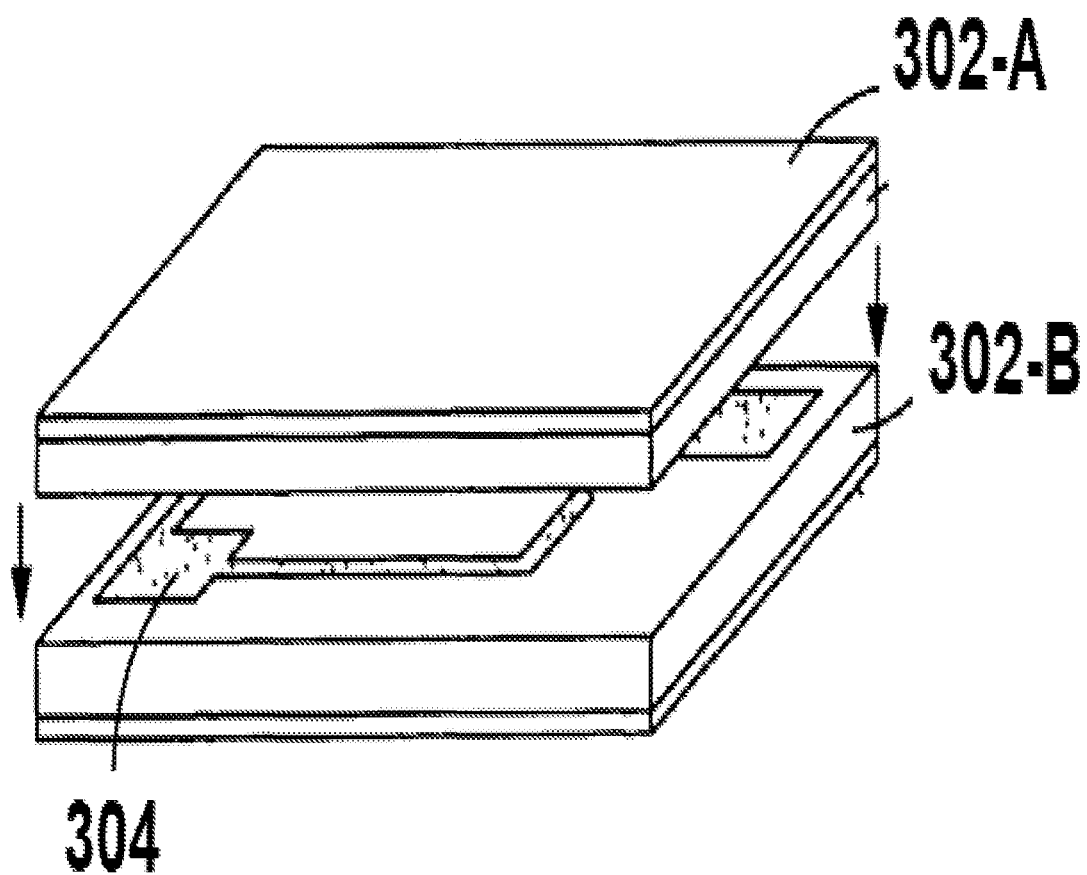
FIG. 3 illustrates various components of the smart contact lens and their positioning, in accordance with an exemplary embodiment of the present disclosure.

FIG. 3 illustrates various components of the smart contact lens and their positioning, in accordance with an exemplary embodiment of the present disclosure.

In an exemplary embodiment, a cross-sectional view of the smart lens (4) having electronic components (304) embedded therein is provided.

In an embodiment, a smart contact lens (4) can be used for performing the one or more operations. The smart contact lens (4) can include a solid component (302-A, 402-B) capable of imparting shape and structure to said lens and a liquid component distributed substantially uniformly in said solid component, capable of favouring the compatibility between said lens and the eye of a wearer of said lens (4), wherein said solid component having one or more electronic components (304) to perform the one or more operations.

In an exemplary embodiment, wherein the one or more operations are associated with financial transactions.

In an exemplary embodiment, the one or more electronic components (304) comprise one or more sensors. The one or more sensors are configured to authenticate a wearer and thereby perform the one or more operations.

In another exemplary embodiment, the one or more sensors are configured to authenticate a wearer and thereby perform the one or more operations.

In an exemplary embodiment, the one or more electronic components (304) comprise a chip that enables wireless communication.

In an exemplary embodiment, the one or more electronic components (304) comprise a light-emitting diode (LED).

In an exemplary embodiment, the one or more electronic components comprise a battery. The battery may be charged by blinking of an eye of a wearer or by moving/rotating an eye ball of a wearer.

In an exemplary embodiment, the one or more electronic components comprise a processor and a memory configured to store data in encrypted form or binary format.

In an exemplary embodiment, the data comprises a wearer's identification to perform the one or more operations.

In an exemplary embodiment, the data comprises a list of financial institutions to perform the one or more operations. The said list of financial institutions is arranged in sequential pattern based on priority to perform the one or more operations.

Figure 4:
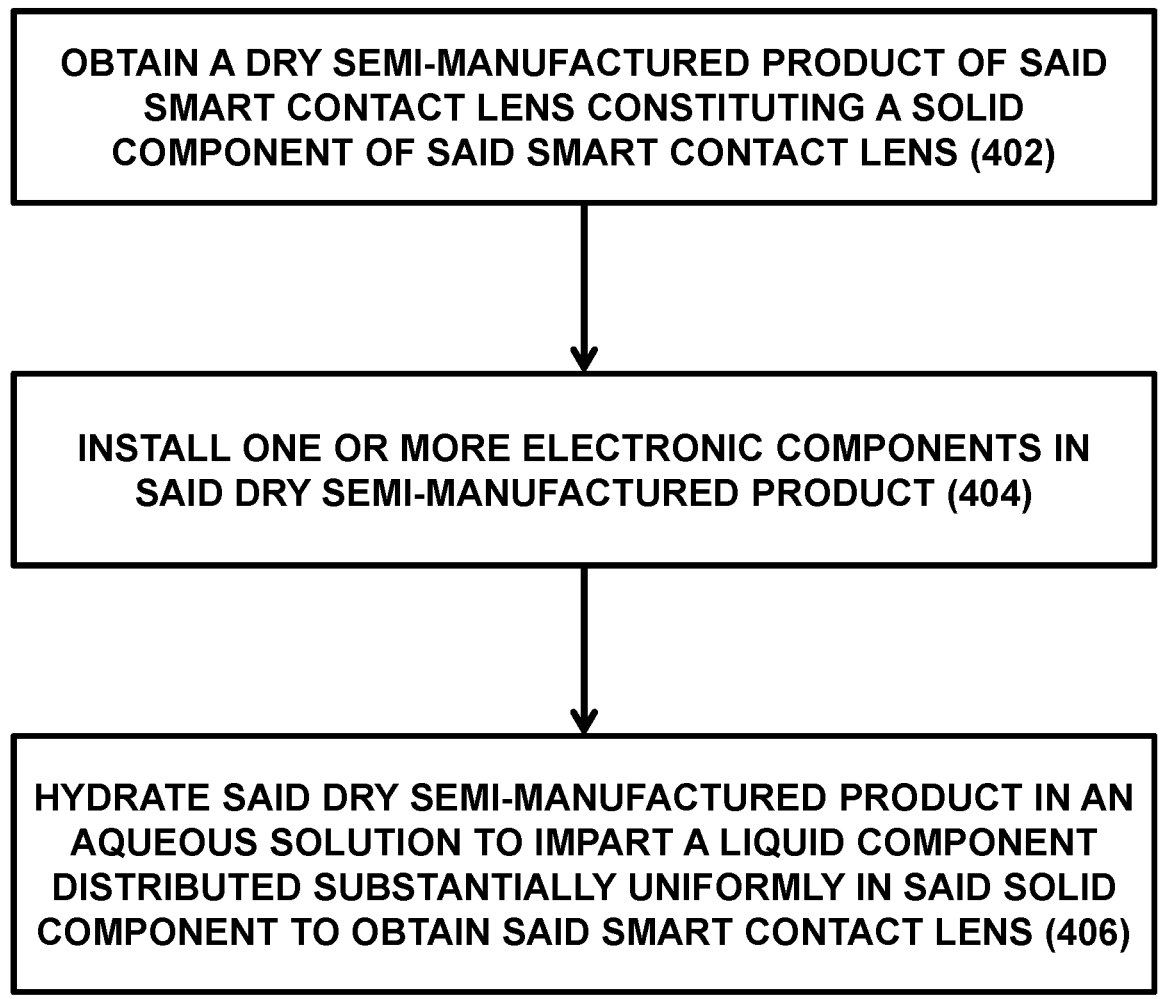
FIG. 4 illustrates an exemplary flowchart of constructing smart contact lens, in accordance with an exemplary embodiment of the present disclosure.

FIG. 4 illustrates an exemplary flowchart of constructing smart contact lens, in accordance with an exemplary embodiment of the present disclosure.

At step 402, a dry semi-manufactured product of said smart contact lens, made of polymeric material, is obtained constituting a solid component of said smart contact lens At step 404, one or more electronic components are installed in said dry semi-manufactured product.

At step 406, said dry semi-manufactured product is hydrated in an aqueous solution to impart a liquid component distributed substantially uniformly in said solid component and thus obtain said smart contact lens.

Figure 5:
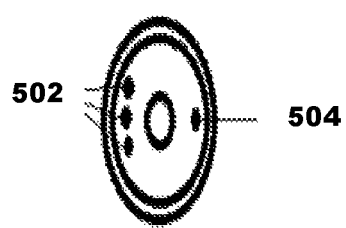
FIG. 5 illustrates an exemplary a diagrammatic perspective view of a smart contact lens with micro embedded switches, in accordance with an exemplary embodiment of the present invention.

In an exemplary embodiment, the one or more electronic components comprise an embedded micro switches (502, 504) to enable and/or disable the features of the smart lens as illustrated in FIG. 5.

In an exemplary embodiment, the embedded micro switches may be pair or connected with an external device such as mobile devices and/or other computing devices to turn on and off.

In an exemplary embodiment, the bank information consisting may be paired with using mobile device and/or other computing devices utilizing small range wireless techniques like Wi-Fi, Bluetooth, NFC and/or other wireless techniques.

In an exemplary embodiment, the authentication may be performed by capturing iris scan of both eyes independently and sending to the authentication server accordingly.

In an exemplary embodiment, the smart contact lens capture the right and left eye iris scan independently and combine and then send to authentication server for authenticate the transaction.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the foregoing describes various embodiments of the invention, other and further embodiments of the invention may be devised without departing from the basic scope thereof. The scope of the invention is determined by the claims that follow in the complete application. The invention is not limited to the described embodiments, versions or examples, which are included to enable a person having ordinary skill in the art to make and use the invention when combined with information and knowledge available to the person having ordinary skill in the art.

Advantages of the Present Invention

The proposed smart wearable contact lens of the present invention provides flexibility to the users to travel and/or do transaction without bank cards.

The proposed smart wearable contact lens of the present invention provides two level security authentications one using biometric iris scan identification and second one is appropriate bank ATM PIN.

The proposed smart wearable contact lens of the present invention enables the user with a provision to enable or disable the RFID feature on the smart wearable contact lens through smartphone.

The proposed smart wearable contact lens of the present invention requires no battery.

The proposed smart wearable contact lens of the present invention is water proof.

The applicability of the proposed smart wearable contact lens of the present invention is not only limited to performing financial transactions but can also be used for wireless communications in applications such as but not limited to:
a. Home automations: blink based lighting and other electronic device control.
b. Automated mail transmission: Sending mails upon blinking of eye in particular fashion say double blinking in a pre-determined time period.
c. Automated Car communication: Making a call from cars when user blinks in particular fashion say double blinking in a pre-determined time period. & etc.

The invention claimed is:

1. A smart contact lens (4) for transacting one or more financial transactions with an ATM or a POS on a display of the ATM or the POS, the smart contact lens (4) comprising:
a solid component (302-A, 402-B), a dry semi-manufactured product of said smart contact lens, made of polymeric material, imparting shape and structure to said lens and a liquid component hydrating said dry semi-manufactured product in an aqueous solution to impart the liquid component distributed substantially uniformly in said solid component;
wherein said solid component having one or more electronic components (304) to perform the financial transactions; characterizing
wherein the one or more electronic components contain electrical components including, one or more sensors, one or more processors to enable wireless communication, one or more micro switches to communicate with the ATM; and a memory configured to store financial institutes data such as credit cards or debit cards in encrypted form or binary format; and
the data comprises a list of financial institutions arranged in sequential pattern based on priority to perform the financial transactions on the display of the ATM or a POS;
wherein the micro-switches enable and/or disable the smart contact lens use for the financial transaction.

2. The smart contact lens as claimed in claim 1, wherein the one or more sensors are configured to authenticate a wearer and thereby perform the financial transaction at the ATM or the POS.

3. The smart contact lens as claimed in claim 1, wherein the one or more electronic components comprise a battery, charged by moving the eyeball of the wearer.

4. The smart contact lens of claim 1, wherein the bank or credit information configured to be loaded on the smart wearable contact lens by placing the device near NEC module.

5. The smart contact lens of claim 1, wherein the embedded micro switches configured to be paired or connected with an external device such as mobile devices or other computing devices to turn the smart contact lens on and off.

* * * * *